(12) United States Patent
Lv et al.

(10) Patent No.: US 11,150,421 B2
(45) Date of Patent: Oct. 19, 2021

(54) OPTICAL FIBER FERRULE ADAPTER

(71) Applicant: Molex, LLC, Lisle, IL (US)

(72) Inventors: Hai-Feng Lv, Zhuhai (CN); Zhong-Sheng Wang, Zhuhai (CN)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/884,045

(22) Filed: May 27, 2020

(65) Prior Publication Data
US 2020/0386952 A1 Dec. 10, 2020

(30) Foreign Application Priority Data
May 31, 2019 (CN) .......................... 201910468685.5

(51) Int. Cl.
G02B 6/42 (2006.01)
G02B 6/38 (2006.01)

(52) U.S. Cl.
CPC ......... G02B 6/4208 (2013.01); G02B 6/3825 (2013.01); G02B 6/3871 (2013.01); G02B 6/3853 (2013.01)

(58) Field of Classification Search
None
See application file for complete search history.

(56) References Cited

U.S. PATENT DOCUMENTS

| 5,499,132 A | 3/1996 | Tojo et al. | |
| 6,048,103 A * | 4/2000 | Furukata | G02B 6/3825 385/73 |
| 6,226,115 B1 * | 5/2001 | Shirasaki | G02B 6/2746 359/280 |

FOREIGN PATENT DOCUMENTS

| CN | 2485662 Y | 4/2002 |
| CN | 2522900 Y | 11/2002 |
| CN | 201331599 Y | 10/2009 |
| CN | 208351164 U | 1/2019 |
| CN | 109782393 A | 5/2019 |

* cited by examiner

*Primary Examiner* — Jerry Rahll

(57) ABSTRACT

The present disclosure provides an optical fiber ferrule adapter. The optical fiber ferrule adapter comprises a first ceramic ferrule, an output optical fiber assembly, and a first collimating lens, a second collimating lens, a half wave plate, a Faraday rotator, a first birefringence member and a second birefringence member which are provided between the first ceramic ferrule and the output optical fiber assembly. The first birefringence member is adjacent to the first ceramic ferrule, the second birefringence member is adjacent to the output optical fiber assembly; the first collimating lens, the second collimating lens, the Faraday rotator and the half wave plate are arranged between the first birefringence member and the second birefringence member; the Faraday rotator is positioned between the first collimating lens and the second collimating lens. The optical fiber ferrule adapter can isolate a reverse light and have a smaller structural dimension, which meets the trend of miniaturization.

9 Claims, 8 Drawing Sheets

OPTICAL FIBER FERRULE ADAPTER

RELATED APPLICATIONS

This application claims priority to Chinese Application No. 2019/10468685.5 filed on May 31, 2019, which is incorporated herein by reference in its entirety.

TECHNICAL FIELD

The present disclosure relates to the field of optical fiber communication technology, and particularly to an optical fiber ferrule adapter.

BACKGROUND

With the development of optical fiber communication technology, an optical fiber ferrule adapter has become an essential component for a connection of optical modules. Various types of ferrule adapters are basically identical in basic structure, that is, high-precision coupling tubes are provided with ceramic ferrules therein, fiber end surfaces of the ceramic ferrules are aligned and coupled to achieve a connection of optical signals. In order to prevent the interference of the signal reverse light to the signal light, it is often to introduce isolators to various optical modules, especially some active products, an exit light from an light source requires to be introduced to the isolator firstly, and then to other optical communication components such as optical amplifiers and the like. The use of separate isolator products requires the use of a fused optical fiber disc cartridge, which will occupy a certain volume, is difficult to manufacture, and affects a miniaturization design of the module. Directly inserting the isolator into the ferrule adapter will save space, which helps a spatial distribution and the design miniaturization of the module.

There are already some designs that the isolator is inserted into the ferrule adapter, for example, Chinese Patent application issuance publication No. CN201331599Y discloses an optical fiber connection device, in the optical fiber connection device, a reverse light is isolated by a polarizer, a Faraday rotator and an depolarizer, the optical fiber connection device achieves a reverse isolation before the collimating lens, and the number of optical members between the two collimating lenses is large, which necessarily requires maintaining a wide beam width and a large beam working distance (generally about 13 mm), resulting in a large length of the optical fiber connection device, which is not beneficial for the trend of component miniaturization.

SUMMARY

An object of the present disclosure is to provide an optical fiber ferrule adapter which can isolate a reverse light and having a smaller structural dimension.

The present disclosure provides an optical fiber ferrule adapter comprising a first ceramic ferrule, an output optical fiber assembly, and a first collimating lens, a second collimating lens, a half wave plate, a Faraday rotator, a first birefringence member and a second birefringence member which are provided between the first ceramic ferrule and the output optical fiber assembly; the first birefringence member is adjacent to the first ceramic ferrule, the second birefringence member is adjacent to the output optical fiber assembly; the first collimating lens, the second collimating lens, the Faraday rotator and the half wave plate are arranged between the first birefringence member and the second birefringence member; the Faraday rotator is positioned between the first collimating lens and the second collimating lens.

Compared with a conventional optical fiber ferrule adapter, in the abovementioned optical fiber ferrule adapter, an incident light is introduced from the first ceramic ferrule, and a pigtail of the output optical fiber assembly is directly fused with an optical fiber at an port of an optical module or an optical component. A reverse light is isolated by an isolator assembly, in which center positions of an ordinary light and an extraordinary light deviate from a center of a receiving end surface of the first ceramic ferrule, and a deviation distance is larger, which can meet requirements of isolating the reverse light. Therefore, the abovementioned optical fiber ferrule adapter can effectively isolate an unconventional signal or stray lights reversed by the optical module or optical component. In addition, in the design, the first collimating lens and the second collimating lens are arranged between the first birefringence member and the second birefringence member, so that the number of components between the two collimating lenses may be reduced and a working distance (which may be shortened to about 2.6 mm) of a light beam may be significantly shortened, which helps to reduce a length and a volume of the optical fiber ferrule adapter.

DETAILED DESCRIPTION OF THE PREFERRED EMBODIMENTS

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure, not to imply that every embodiment thereof must have the described feature. Furthermore, it should be noted that the description illustrates a number of features While certain features have been combined together to illustrate potential system designs, those features may also be used in other combinations not expressly disclosed. Thus, the depicted combinations are not intended to be limiting, unless otherwise noted.

In the embodiments illustrated in the figures, representations of directions such as up, down, left, right, front and rear, used for explaining the structure and movement of the various parts of the present disclosure, are not absolute, but relative. These representations are appropriate when the parts are in the position shown in the figures. If the description of the position of the parts changes, however, these representations are to be changed accordingly.

Hereinafter, embodiments of the present disclosure will be further described in detail in combination with the figures.

Figure 1:
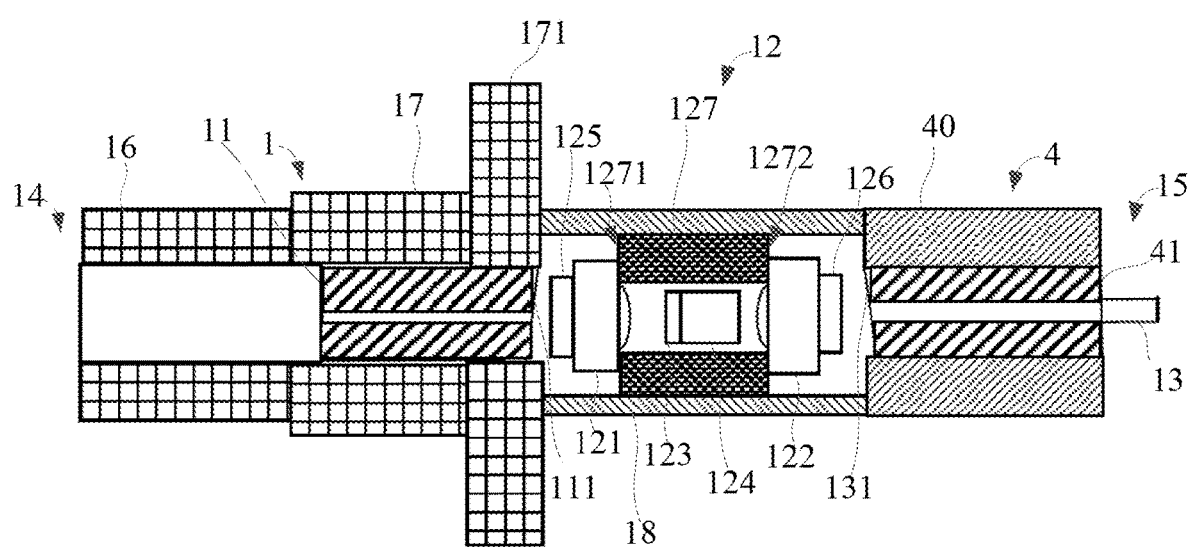
FIG. 1 is a schematic view of a basic structure of an optical fiber ferrule adapter of a first embodiment of the present disclosure.

Referring to FIG. 1, FIG. 1 illustrates a schematic view of a basic structure of an optical fiber ferrule adapter of a first embodiment of the present disclosure. The optical fiber ferrule adapter mainly includes a first ceramic ferrule 11, an isolator assembly 12 and an output optical fiber assembly 13, in which the output optical fiber assembly 13 may be a single optical fiber pigtail (Pigtail) or a second ceramic ferrule with a pigtail.

The optical fiber ferrule adapter is provided with an incident end 14 and an output end 15. An incident light enters from the incident end 14 of the optical fiber ferrule adapter, passes through the isolator assembly 12, and then outputs from the output end 15 of the optical fiber ferrule adapter. Therefore, a forward transmission direction of a light is from the incident end 14 to the output end 15, the optical fiber ferrule adapter is integrated with a function of an optical isolator, which may isolate an unconventional optical signal or stray lights transmitting in a reverse direction. The first ceramic ferrule 11 is positioned to the incident end 14 of the optical fiber ferrule adapter, the output optical fiber assembly 13 is positioned to the output end 15 of the optical fiber ferrule adapter. For convenience of description, it is defined that a direction from the incident end 14 to the output end 15 is a direction from front to rear.

Referring to FIG. 1, the first ceramic ferrule 11 is fixed to a front end of the isolator assembly 12 through an incident end connection device 1. The output optical fiber assembly 13 is fixed to a rear end of the isolator assembly 12 through the output connection device 4. Structures of the incident end connection device 1 and the output connection device 4 are not shown in detail, but only schematically drawn in outline.

Figure 2:
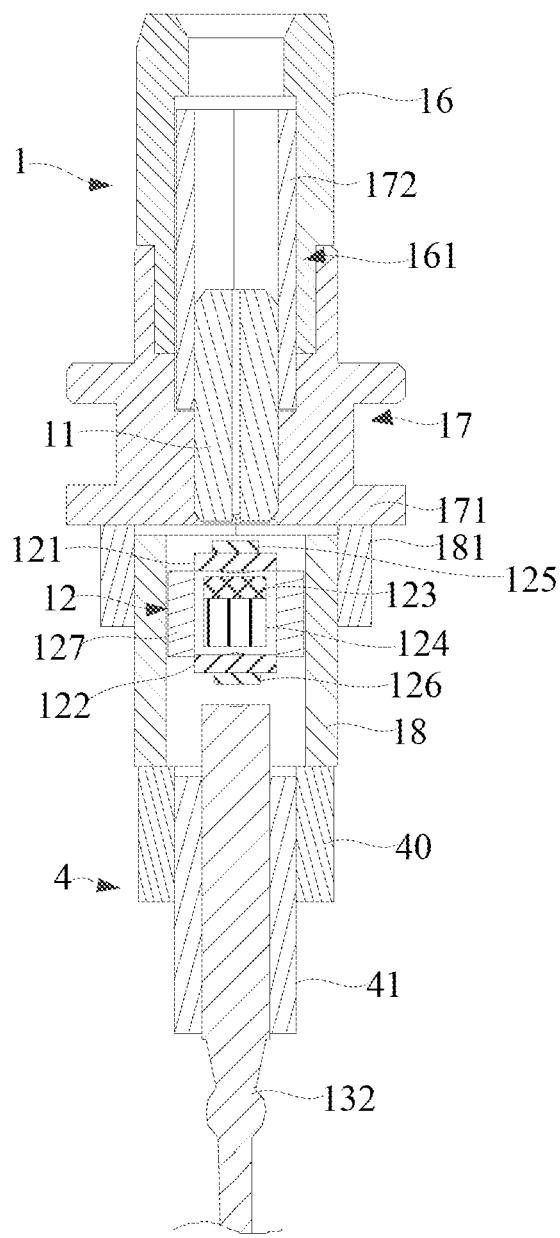
FIG. 2 is a cross-sectional view of a specific embodiment of the optical fiber ferrule adapter shown in FIG. 1.
Figure 3:
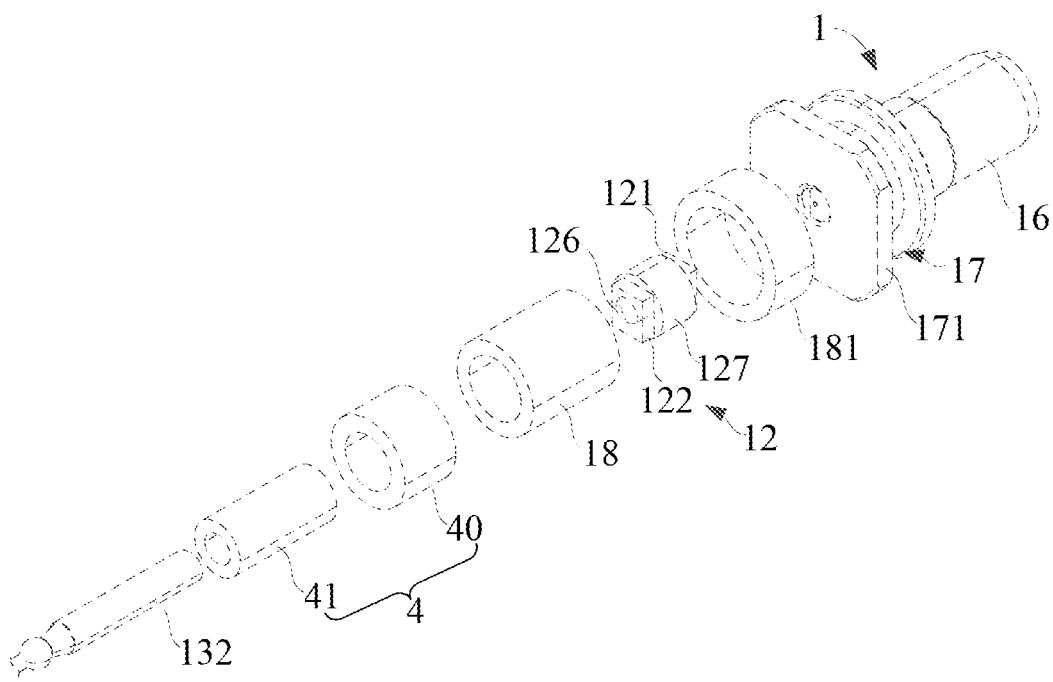
FIG. 3 is an exploded perspective view of the optical fiber ferrule adapter shown in FIG. 2.

Referring to FIG. 2, FIG. 2 is a detailed structural view of the optical fiber ferrule adapter shown in FIG. 1. The incident end connection device 1 includes a mating sleeve 16 and a fixing seat 17 fixed and provided behind the mating sleeve 16. Specifically, the mating sleeve 16 is connected with the fixing seat 17 through a step portion 161 to enhance stability of the connection between the mating sleeve 16 and the fixing seat 17.

An inner tube 172 is further fixed and provided on the fixing seat 17. Furthermore, two flanges 171 protruding outwardly along a periphery of the fixing seat 17 are provided to a rear end of the fixing seat 17, so as to be fixed together with another mating component (not shown in figures) to prevent from detaching. A rear wall surface of the flange 171 positioned at rear also provides a mounting surface for mounting the isolator assembly 12. An inner diameter of the inner tube 172 matches a diameter of the first ceramic ferrule 11, the inner tube 172 sheathes a front end of the first ceramic ferrule 11 and a mating cavity is formed in front of the first ceramic ferrule 11 in the inner tube 172, so as to allow the first ceramic ferrule 11 to be aligned with another mating ferrule (not shown in figures). The inner tube 172 is preferably a steel tube. An expanded beam optical fiber is preferably fixed in the ceramic ferrule 11, so that a wider working beam can be obtained.

The output connection device 4 includes a second tube 40 and a third tube 41 further accommodated in the second tube 40. The output optical fiber assembly 13 is accommodated in the third tube 41. An inner diameter of the third tube 41 matches a diameter of the output optical fiber assembly 13 to fix the output optical fiber assembly 13 steadily. Specifically, the second tube 40 and the third tube 41 are glass tubes. The output optical fiber assembly 13 is preferably a single optical fiber pigtail 132.

Furthermore, before the assembling of the second tube 40 and the third tube 41 is completed, a mounting position of the second tube 40 and the third tube 41 may be adjusted in a front-rear direction, and then a position of the output optical fiber assembly 13 in the front-rear direction may be adjusted. For example, focusing the output optical fiber assembly 13 and other operations can be performed.

With referring to FIG. 1 and FIG. 2, an end surface 111 of an end of the first ceramic ferrule 11 adjacent to the isolator assembly 12 and an end surface 131 of the single optical fiber pigtail 132 of an end of the output optical fiber assembly 13 adjacent to the isolator assembly 12 are all polished with an eight-degree angle for increasing return loss.

The incident light is introduced from an optical fiber in the first ceramic ferrule 11, the pigtail 132 of the output optical fiber assembly 13 is directly fused with an optical fiber at a port of an optical module or an optical component.

Referring to FIG. 2, the isolator assembly 12 is accommodated in a first tube 18. The first tube 18 allows that the isolator assembly 12 can be provided separately. Specifically, an adjusting ring 181 further sheathes an outside of the first tube 18. The first tube 18 is connected by attaching a front wall surface of the adjusting ring 181 to the rear wall surface of the flange 171 of the fixing seat 17, thereby ensuring that the isolator assembly 12 is aligned with the first ceramic ferrule 11 in an axial direction. A position between the first tube 18 and the adjusting ring 181 in the front-rear direction is adjusted to obtain a required optical performance parameter during product assembling, finally the first tube 18 and the adjusting ring 181a are fixed together by bonding to facilitate production and achieving an optical path requirement such as beam focusing and the like.

In the abovementioned optical fiber ferrule adapter, a first separate assembly is assembled by fixing the first ceramic ferrule 11 in the incident end connection device 1. A second separate assembly is assembled by fixing the isolator assembly 12 in the first tube 18. A third separate assembly is assembled by fixing the output optical fiber assembly 13 to the output connection device 4. Then the incident end connection device 1, the first tube 18 and the output connection device 4 are sequentially connected together, thereby achieving assembling of the abovementioned optical fiber ferrule adapter. The incident end connection device 1, the first tube 18 and the output connection device 4 may be connected therebetween by means of bonding. The fixing seat 17 is provided with the flange 171 to facilitate bonding between the fixing seat 17 and the first tube 18.

Referring to FIG. 1 and FIG. 2, the isolator assembly 12 includes a first collimating lens 121, a second collimating lens 122, a half wave plate 123, a Faraday rotator 124, a first birefringence member 125 and a second birefringence member 126. The first collimating lens 121, the second collimating lens 122, the half wave plate 123, the Faraday rotator 124, the first birefringence member 125 and the second birefringence member 126 are provided between the first ceramic ferrule 11 and the output optical fiber assembly 13.

Referring to FIG. 1 and FIG. 2, the first birefringence member 125 is adjacent to the first ceramic ferrule 11. The second birefringence member 126 is adjacent to the output optical fiber assembly 13. The first collimating lens 121, the second collimating lens 122, the Faraday rotator 124 and the half wave plate 123 are arranged between the first birefringence member 125 and the second birefringence member 126. The Faraday rotator 124 is positioned between the first collimating lens 121 and the second collimating lens 122.

Specifically, in the embodiment shown in FIG. 2, the half wave plate 123 is positioned between the Faraday rotator 124 and the first birefringence member, and more specifically, the half wave plate 123 and the Faraday rotator 124 are bonded together.

Furthermore, the isolator assembly 12 further includes a magnetic ring 127. The magnetic ring 127 provides a magnetic field for the Faraday rotator 124 so that the Faraday rotator 124 may deflect a direction of a polarized light, the magnetic ring 127 is fixed at a middle position of an inner wall of the first tube 18. The first tube 18 is preferably a glass tube.

An end surface of an end of the magnetic ring 127 toward the first ceramic ferrule 11 is a first end surface 1271, an end surface of an end of the magnetic ring 127 toward the output optical fiber assembly 13 is a second end surface 1272.

Figure 4:
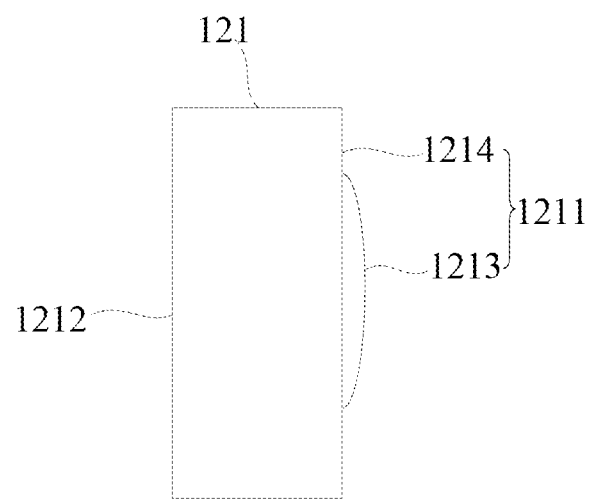
FIG. 4 is a structural schematic view of a first collimating lens shown in FIG. 1.

Specifically, in the embodiment, with referring to FIG. 1 and FIG. 4, the first collimating lens 121 is attached to the first end surface 1271 of the magnetic ring 127, the second collimating lens 122 is attached to the second end surface 1272 of the magnetic ring 127. A side surface of a side of the first collimating lens 121 toward the magnetic ring 127 is a first inner surface 1211, and oppositely, a side surface of a side of the first collimating lens 121 toward the first ceramic ferrule 11 is a first outer surface 1212.

The first inner surface 1211 of the first collimating lens 121 includes a protruding surface 1213 and a connection planar surface 1214 positioned to a periphery of the protruding surface 1213, the connection planar surface 1214 is used to be connected with the magnetic ring 127. A diameter of the protruding surface 1213 is slightly smaller than a diameter of the first collimating lens 121. The connection planar surface 1214 and the first outer surface 1212 are planar, the connection planar surface 1214 and the first end surface 1271 of the magnetic ring 127 are conveniently bonded together.

Figure 5:
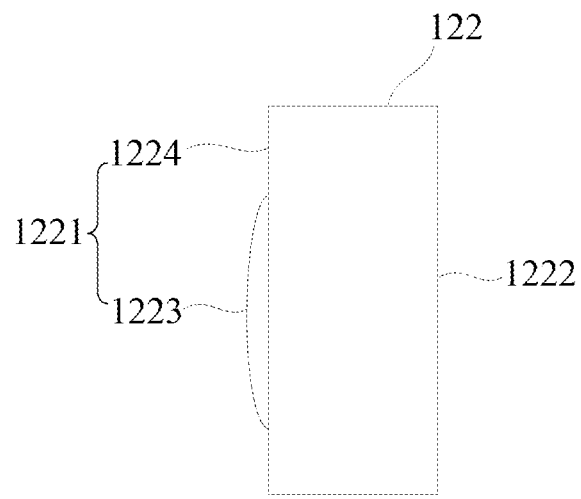
FIG. 5 is a structural schematic view of a second collimating lens shown in FIG. 1.

Referring to FIG. 1 and FIG. 5, a side surface of a side of the second collimating lens 122 toward the magnetic ring 127 is a second inner surface 1221, and oppositely, a side surface of a side of the second collimating lens 122 toward the output optical fiber assembly 13 is a second outer surface 1222.

Similarly, the second inner surface 1221 of the second collimating lens 122 toward the magnetic ring 127 includes a protruding surface 1223 and a connection planar surface 1224 positioned to a periphery of the protruding surface 1223. A diameter of the protruding surface 1223 is slightly smaller than a diameter of the second collimating lens 122. The connection planar surface 1224 is used to be connected with the magnetic ring 127. The connection planar surface 1224 and the second outer surface 1222 are planar, the connection planar surface 1224 and the second end surface 1272 of the magnetic ring 127 are conveniently bonded together.

Referring to FIG. 1 and FIG. 2, specifically, in the first embodiment, the first birefringence member 125 is attached to the first outer surface 1212 of the first collimating lens 121. The second birefringence member 126 is attached to the second outer surface 1222 of the second collimating lens 122.

Referring to FIG. 1 and FIG. 2, the half wave plate 123 and the Faraday rotator 124 are accommodated in the magnetic ring 127. Furthermore, the half wave plate 123 is positioned between the first collimating lens 121 and the Faraday rotator 124. The half wave plate 123 is attached to a side of the Faraday rotator 124 toward the first collimating lens 121. And in other embodiments not shown, the positions of the half wave plate 123 and the Faraday rotator 124 may also be interchanged. In the design, the first collimating lens 121 and the second collimating lens 122 are provided between the first birefringence member 125 and the second birefringence member 126, so that a working distance of a light beam may be significantly shortened (the working distance may be shortened to about 2.6 mm), a length of the optical fiber ferrule adapter to be reduced becomes possible; the first collimating lens 121, the second collimating lens 122, the half wave plate 123, the Faraday rotator 124, the first birefringence member 125 and the second birefringence member 126 may be integrated into an extremely compact isolator assembly 12 through a combination structure between the abovementioned components, thereby significantly reducing a length and a volume of the optical fiber ferrule adapter, which helps miniaturization of the optical fiber ferrule adapter.

Figure 6:
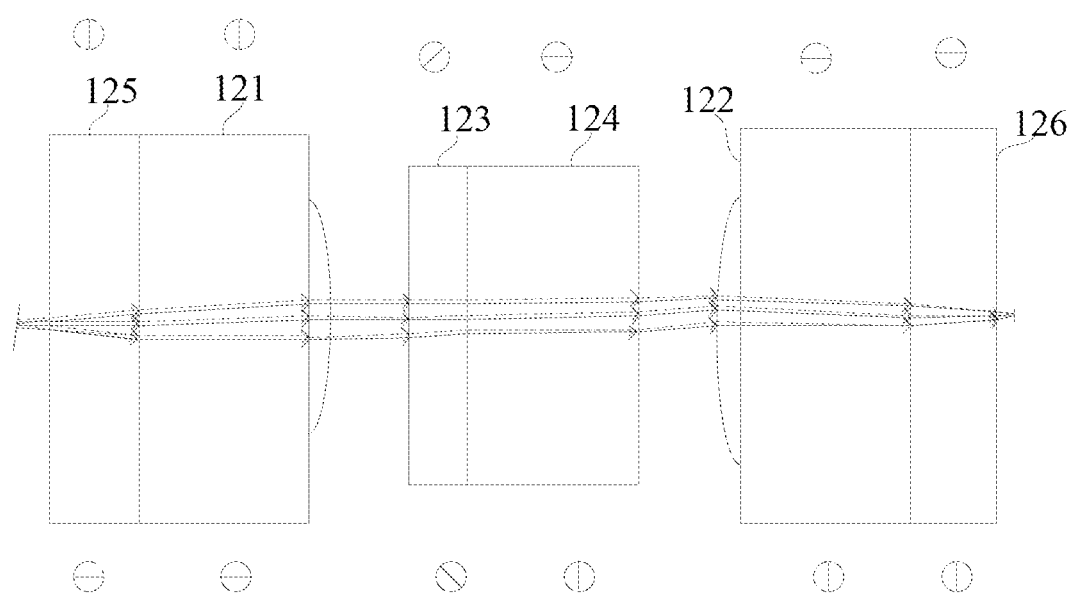
FIG. 6 is a forward beam path diagram of the optical fiber ferrule adapter shown in FIG. 1.

An angle between a crystal axis direction of the half wave plate 123 and crystal axis directions of the first birefringence member 125 and the second birefringence member 126 are preferably set as 22.5 degrees. As shown in a forward beam path diagram shown in FIG. 6, it is defined that the crystal axis directions of the first birefringence member 125, the second birefringence member 126 each are an X-axis direction, the crystal axis direction of the half wave plate 123 is positioned to rotate 22.5 degrees clockwise from the X-axis direction. After polarized lights, i.e. ordinary light and extraordinary light, pass through the half wave plate 123, polarization directions thereof will rotate 45 degrees clockwise. A polarization rotation direction of the Faraday rotator 124 is also set to rotate 45 degrees clockwise. Therefore, the incident light from the first ceramic ferrule 11 is split into the ordinary light and the extraordinary light after passing through the first birefringence member 125, and then after passing through the half wave plate 123 and the Faraday rotator 124, the polarization directions of the ordinary light and the extraordinary light rotate 90 degrees clockwise (i.e. the ordinary light turns to the extraordinary light, the extraordinary light to the ordinary light), the ordinary light and the extraordinary light then combine into a beam passing through the second birefringence member 126, and finally converge at an output port to output outwardly passing through the output optical fiber assembly 13.

Figure 7:
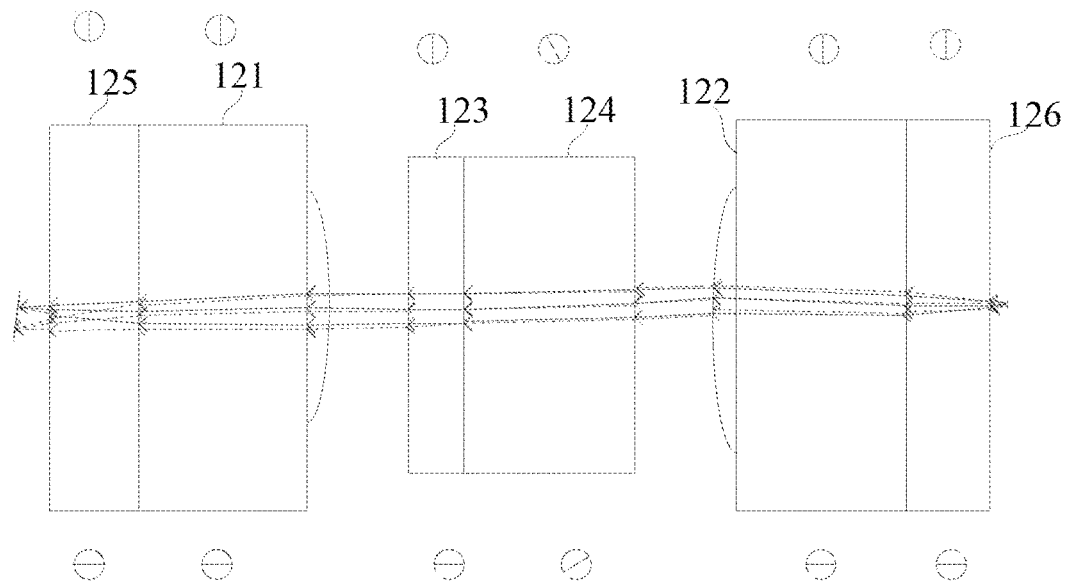
FIG. 7 is a reverse beam path diagram of the optical fiber ferrule adapter shown in FIG. 1.

Referring to FIG. 7, FIG. 7 is a reverse beam path diagram of the optical fiber ferrule adapter. When a reverse light of an optical path propagates in the reverse direction, the reverse light is firstly split into the polarized lights, i.e. ordinary light and extraordinary light, passing through the second birefringence member 126, the ordinary light and the extraordinary light rotate 45 degrees counterclockwise after passing through the Faraday rotator 124, and then rotate 45 degrees clockwise after passing through the half wave plate 123, the polarization directions remain the same (the ordinary light is still the ordinary light, the extraordinary light is still the extraordinary light). The ordinary light and the extraordinary light cannot combine passing through the first birefringence member 125, and will deviate from a center of a receiving end surface of the first ceramic ferrule 11 respectively. For example, for a light source with an optical fiber model field diameter MFD (Model Field Diameter) of 9.2 μm, center positions of the ordinary light and the extraordinary light deviate from the center of the receiving end surface of the first ceramic ferrule 11 by about 22.5 μm, and deviation distances are large enough to meet requirements of isolating the reverse light. Therefore, the above-mentioned optical fiber ferrule adapter does not need to add an additional isolator for isolation, and may effectively isolate the unconventional signal or the stray lights reversed by the optical module or the optical component.

In other embodiments, the crystal axis direction of the half wave plate 123 relative to the crystal axis directions of the birefringence members may also rotate 22.5 degrees counterclockwise, the ordinary light and the extraordinary light rotate 45 degrees counterclockwise respectively passing through the half wave plate 123, while only the polarization rotation direction of the Faraday rotator 124 is required to be set to rotate 45 degrees counterclockwise, that is, the ordinary light turns to the extraordinary light, the extraordinary light turns to the ordinary light after the incident light passes through the half wave plate 123 and the Faraday rotator 124, and finally the ordinary light and the extraordinary light converge at the port at the output end 15, which also may achieve the same effect.

The first ceramic ferrule 11 is fixed in the incident end connection device 1, the magnetic ring 127 is fixed in the first tube 18, the output optical fiber assembly 13 is fixed in the output connection device 4, and the incident end connection device 1, the first tube 18 and the output connection device 4 are sequentially connected.

Furthermore, the isolator assembly 12 is packaged in the first tube 18. Due to the connection planar surface 1214 of the first collimating lens 121 and the connection planar surface 1224 of the second collimating lens 122 are attached on planar surfaces of both ends of the magnetic ring 127, so that ensuring concentricity of the first collimating lens 121 and the second collimating lens 122, achieving a higher coupling efficiency.

And in assembling, if relative positions of the first ceramic ferrule 11, the isolator assembly 12 and the output optical fiber assembly 13 requires to be adjusted, positions of the adjusting ring 181, the first tube 18, the second tube 40 and the third tube 41 may be adjusted, and the adjusting ring 181, the first tube 18, the second tube 40 and the third tube 41 are separate each other to facilitate being adjusted separately, therefore, the relative positions of the first ceramic ferrule 11, the isolator assembly 12 and the output optical fiber assembly 13 may be easily adjusted, which helps production and assembling and improves coupling efficiency of the abovementioned optical fiber ferrule adapter.

Figure 8:
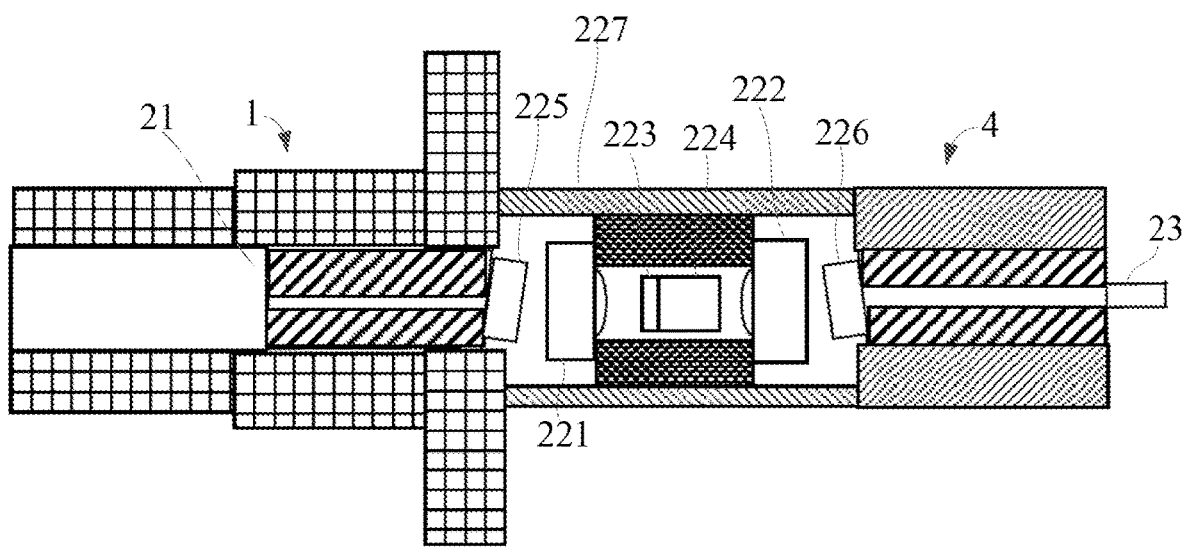
FIG. 8 is a schematic view of a basic structure of an optical fiber ferrule adapter of a second embodiment of the present disclosure.

In a schematic view of a basic structure of a second embodiment shown in FIG. 8, a first collimating lens 221 and a second collimating lens 222 are provided to both ends of a magnetic ring 227 respectively. A half wave plate 223 and a Faraday rotator 224 are respectively accommodated in a magnetic ring 227. A first birefringence member 225 may be further attached to a first ceramic ferrule 21, a second birefringence member 226 may be further attached to an output optical fiber assembly 23.

The first birefringence member 225 and the second birefringence member 226 are preferably directly bonded on end surfaces of the first ceramic ferrule 21 and the output optical fiber assembly 23 respectively, the first birefringence member 225 and the second birefringence member 226 are divided from a spatial position, and form separate structures respectively with the first ceramic ferrule 21 and the output optical fiber assembly 23. Compared with the first embodiment, in the second embodiment, requirements of the optical fiber ferrule adapter on assembling accuracy of core assemblies of the optical isolator is reduced, which helps to improve a product qualified rate. In order to accurately attach the first birefringence member 225 and the second birefringence member 226, a groove or a mark may be provided on the inclined eight-degree end surfaces of the first ceramic ferrule 21 and the output optical fiber assembly 23 for accurate control.

Figure 9:
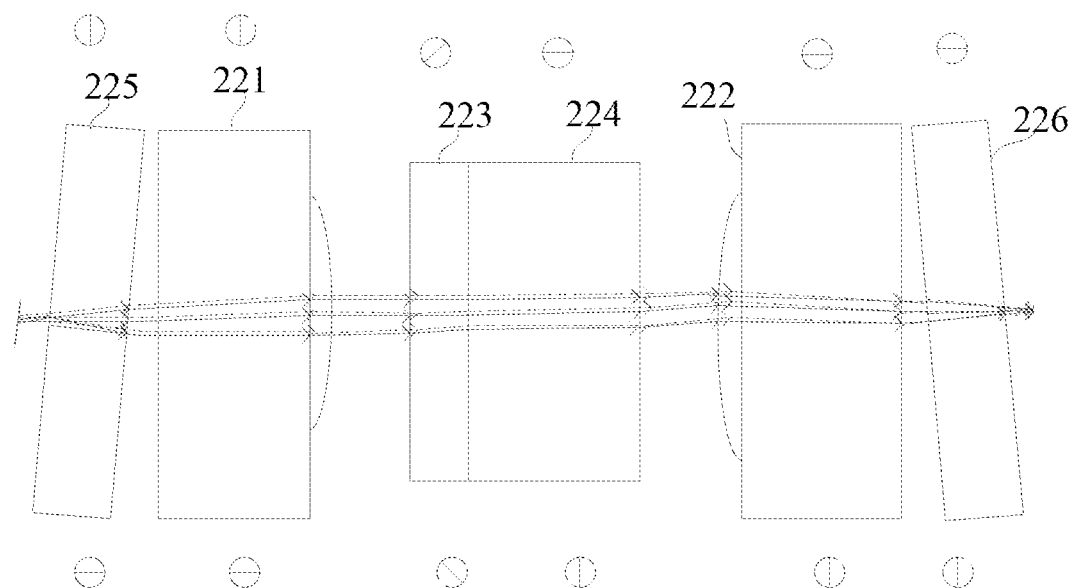
FIG. 9 is a forward beam path diagram of the optical fiber ferrule adapter shown in FIG. 8.

FIG. 9 is a forward beam path diagram of the optical fiber ferrule adapter of the second embodiment. Forward isolation principle and polarization variation of the optical fiber ferrule adapter are the same as those of the first embodiment, and will not be repeated here.

Figure 10:
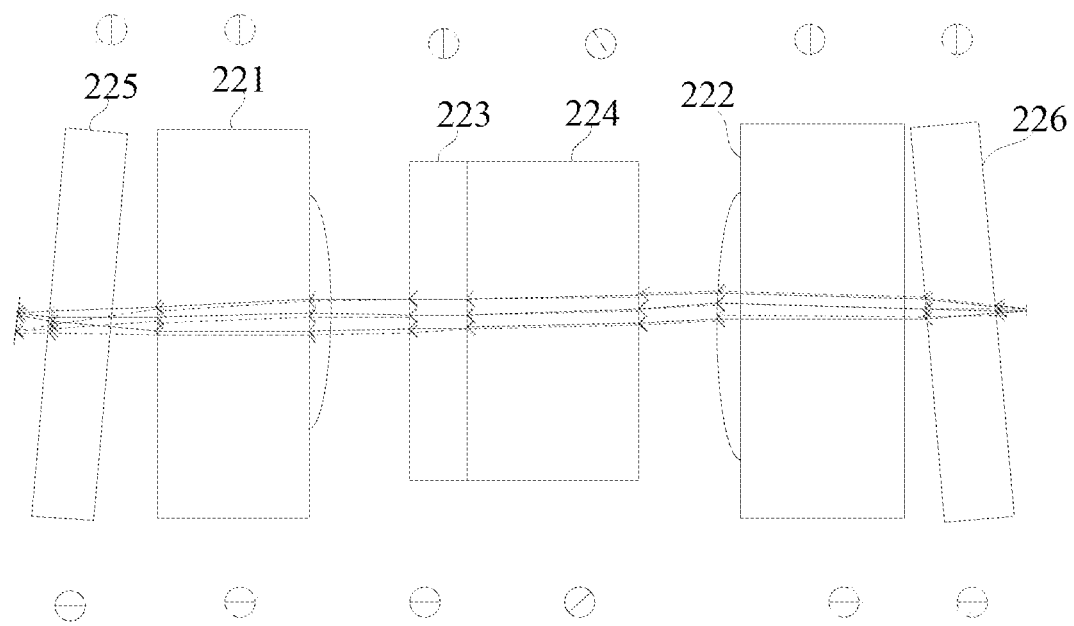
FIG. 10 is a reverse beam path diagram of the optical fiber ferrule adapter shown in FIG. 8.

Referring to FIG. 10, FIG. 10 is a reverse beam path diagram of the optical fiber ferrule adapter. The reverse isolator principle and polarization variation of the optical fiber ferrule adapter are the same as those of the first embodiment, and will not be repeated here. It should be noted that if an isolation in the reverse direction cannot meet requirements, because the incident end connection device 1, the first tube 18 and the output connection device 4 are separate each other before being bonded and fixed together, angles of the crystal axes of the first birefringence member 225, the second birefringence member 226 and the half wave plate 223 may be finely adjusted during assembling the optical fiber ferrule adapter to meet requirements of the abovementioned optical fiber ceramic ferrule adapter for the isolation of the reverse light.

Figure 11:
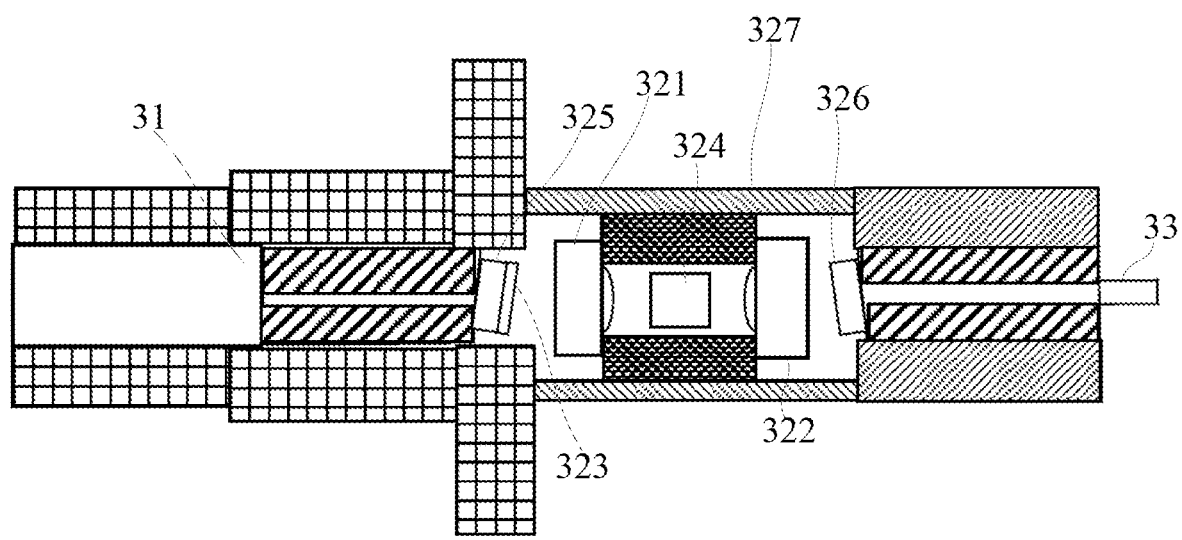
FIG. 11 is a schematic view of a basic structure of an optical fiber ferrule adapter of a third embodiment of the present disclosure.

In a schematic view of a basic structure of a third embodiment shown in FIG. 11, a first collimating lens 321 and a second collimating lens 322 are provided to both ends of a magnetic ring 327 respectively. A Faraday rotator 324 is accommodated in a magnetic ring 327. A first birefringence member 325 is attached to a first ceramic ferrule 31. A second birefringence member 326 is attached to an output optical fiber assembly 33. A half wave plate 323 is attached to a side of the first birefringence member 325 away from the first ceramic ferrule 31.

Figure 12:
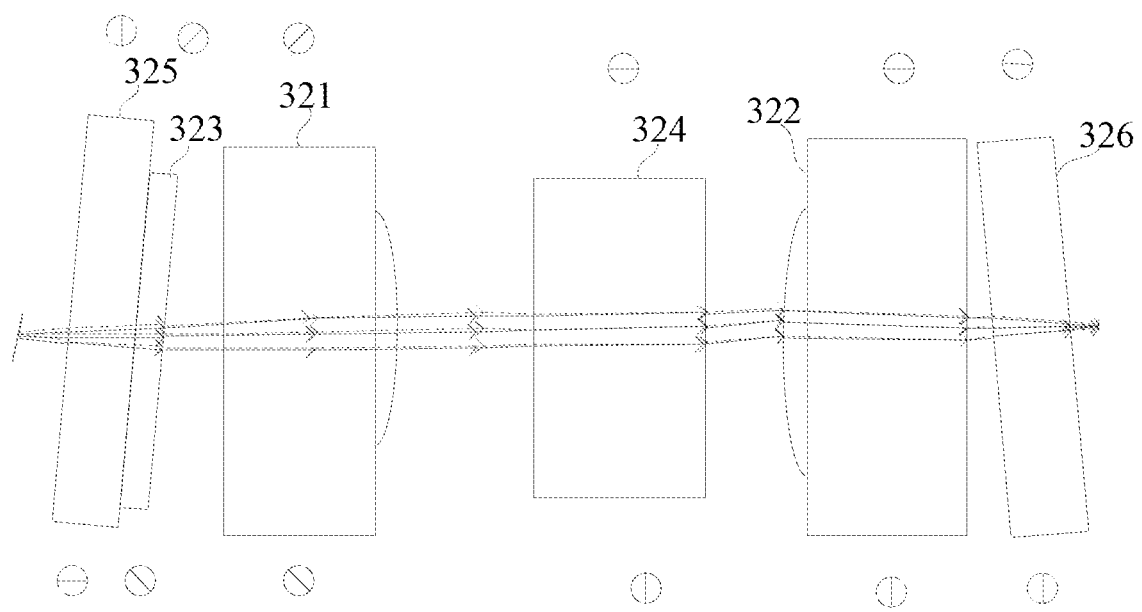
FIG. 12 is a forward beam path diagram of the optical fiber ferrule adapter shown in FIG. 11.

FIG. 12 is a forward beam path diagram of the optical fiber ferrule adapter of the third embodiment. It is defined that a crystal axis direction of the first birefringence member 325 is the X-axis direction, a crystal axis direction of the half wave plate 323 is positioned to rotate 22.5 degrees clockwise from the X-axis direction. After polarized lights, i.e. ordinary light and extraordinary light, pass through the half wave plate 323, polarization directions of the ordinary light and the extraordinary light will rotate 45 degrees clockwise. A polarization rotation direction of the Faraday rotator 324 is also set to rotate 45 degrees clockwise. Therefore, the incident light will rotate 90 degrees clockwise after passing through the half wave plate 323 and the Faraday rotator 324, the ordinary light turns to the extraordinary light, the extraordinary light turns to the ordinary light, finally the ordinary light and the extraordinary light converge at the port at the output end.

Figure 13:
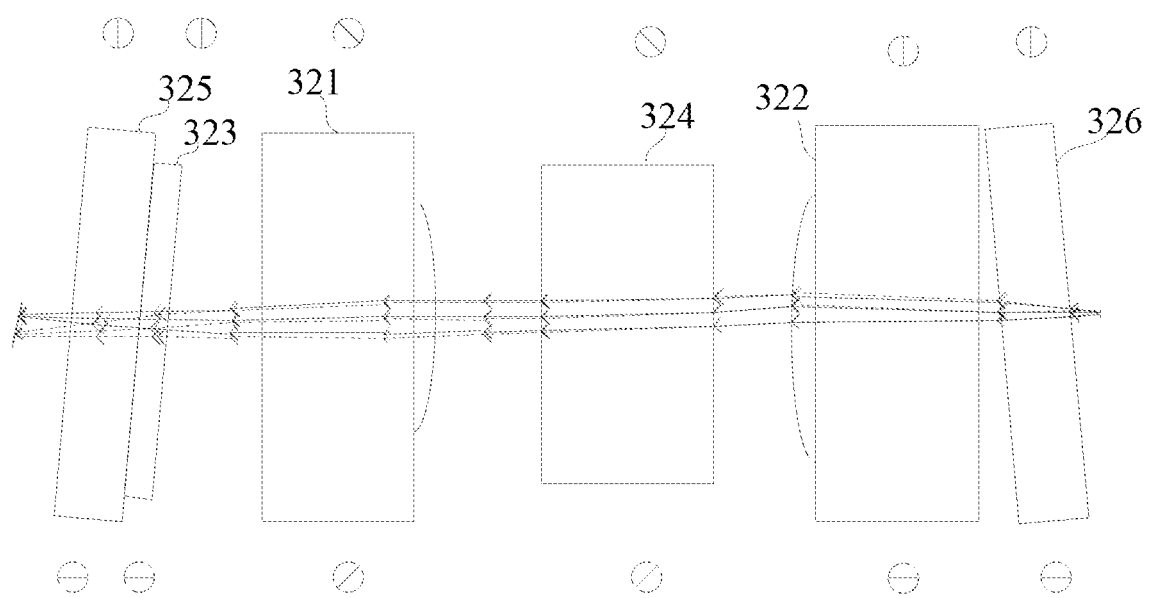
FIG. 13 is a reverse beam path diagram of the optical fiber ferrule adapter shown in FIG. 11.

Referring to FIG. 13, FIG. 13 is a reverse beam path diagram of the optical fiber ferrule adapter. The reverse isolation principle and polarization variation of the optical fiber ferrule adapter are the same as those of the first embodiment, and will not be repeated here. It should be noted that if the isolation in the reverse direction cannot meet requirements, because the incident end connection device 1, the first tube 18 and the output connection device 4 are separate each other before being bonded and fixed together, angles of the crystal axes of the first birefringence member 325, the second birefringence member 326 and the half wave plate 323 may be finely adjusted to meet requirements of the abovementioned optical fiber ceramic ferrule adapter for the isolation of the reverse light.

Although the present disclosure has been described with reference to several exemplary embodiments, it should be understood that the terminology used is illustrative and exemplary rather than limiting. Since the present disclosure can be embodied in various forms without departing from the spirit or essence of the present disclosure, it should be understood that the above-described embodiments are not limited to any of the foregoing details, but should be widely interpreted within the spirit and scope defined by the appended claims, therefore, all variations and modifications falling within the scope of the claims or equivalent ranges of the claims should be covered by the appended claims.

The invention claimed is:

1. An optical fiber ferrule adapter comprising: a first ceramic ferrule, an output optical fiber assembly, and a first collimating lens, a second collimating lens, a half wave plate, a Faraday rotator, a first birefringence member and a second birefringence member which are provided between the first ceramic ferrule and the output optical fiber assembly;
   the first birefringence member being adjacent to the first ceramic ferrule, the second birefringence member being adjacent to the output optical fiber assembly; the first collimating lens, the second collimating lens, the Faraday rotator and the half wave plate being arranged between the first birefringence member and the second birefringence member; the Faraday rotator being positioned between the first collimating lens and the second collimating lens; and
   wherein the Faraday rotator is accommodated in a magnetic ring, the first collimating lens is attached to a first end surface of the magnetic ring toward the first ceramic ferrule, the second collimating lens is attached to a second end surface of the magnetic ring toward the output optical fiber assembly.

2. The optical fiber ferrule adapter according to claim 1, wherein the half wave plate is also accommodated in the magnetic ring and adjacent to the Faraday rotator.

3. The optical fiber ferrule adapter according to claim 1, wherein the first birefringence member is attached to a first outer surface of the first collimating lens toward the first ceramic ferrule, the second birefringence member is attached to a second outer surface of the second collimating lens toward the output optical fiber assembly.

4. The optical fiber ferrule adapter according to claim 1, wherein the first birefringence member is attached to the first ceramic ferrule, the second birefringence member is attached to the output optical fiber assembly.

5. The optical fiber ferrule adapter according to claim 1, wherein the first birefringence member is attached to the first ceramic ferrule, the half wave plate is attached to a side of the first birefringence member away from the first ceramic ferrule; the second birefringence member is attached to the output optical fiber assembly.

6. The optical fiber ferrule adapter according to claim 1, wherein the first ceramic ferrule is fixed in an incident end connection device, the magnetic ring is fixed in a first tube, the output optical fiber assembly is fixed in an output connection device, the incident end connection device, the first tube and the output connection device are sequentially connected together.

7. The optical fiber ferrule adapter according to claim 6, wherein the incident end connection device comprises a mating sleeve, a fixing seat provided behind the mating sleeve and an inner tube accommodated in the fixing seat, the first ceramic ferrule is accommodated in the inner tube.

8. The optical fiber ferrule adapter according to claim 7, wherein the output connection device comprises a second tube and a third tube accommodated in the second tube, the second tube is fixed to the first tube, and the output optical fiber assembly is accommodated in the third tube.

9. The optical fiber ferrule adapter according to claim 6, wherein the first end surface and the second end surface of the magnetic ring are planar surfaces, inner surfaces of the first collimating lens and the second collimating lens toward the magnetic ring each comprise a protruding surface positioned to a center thereof and a connection planar surface positioned to a periphery of the protruding surface, the connection planar surface are correspondingly attached to the first end surface and the second end surface of the magnetic ring.

* * * * *